US012719204B2

(12) United States Patent
Yoshimura

(10) Patent No.: US 12,719,204 B2
(45) Date of Patent: Aug. 25, 2026

(54) COAXIAL CONNECTOR WITH WATERPROOF STRUCTURE

(71) Applicant: Tyco Electronics Japan G.K., Kawasaki (JP)

(72) Inventor: Kentaro Yoshimura, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 326 days.

(21) Appl. No.: 18/539,908

(22) Filed: Dec. 14, 2023

(65) Prior Publication Data

US 2024/0204448 A1 Jun. 20, 2024

(30) Foreign Application Priority Data

Dec. 14, 2022 (JP) ................................ 2022-199134

(51) Int. Cl.
*H01R 13/52* (2006.01)
*H01R 43/00* (2006.01)

(52) U.S. Cl.
CPC ....... *H01R 13/5202* (2013.01); *H01R 43/005* (2013.01)

(58) Field of Classification Search
CPC .............. H01R 13/5202; H01R 13/533; H01R 11/284; H01R 24/38
USPC ........................................ 439/519, 521, 578
See application file for complete search history.

(56) References Cited

U.S. PATENT DOCUMENTS 5,975,945 A * 11/1999 Daoud ................ H01R 9/2441 361/124
6,848,949 B2 * 2/2005 Mullaney ........... H01R 13/7032 439/676
11,515,673 B2 * 11/2022 Kato .................. H01R 13/6215
12,261,392 B2 * 3/2025 Xu ....................... H01R 13/533
2018/0006407 A1 * 1/2018 Sasaki .................... H01R 24/40
2024/0204447 A1 * 6/2024 Yoshimura ............. H01R 13/52

FOREIGN PATENT DOCUMENTS

JP 2021166161 A 10/2021

* cited by examiner

*Primary Examiner* — Hae Moon Hyeon

(57) ABSTRACT

A connector comprises a housing, a signal contact, an outer shield, a first potting reservoir, and a second potting reservoir. The signal contact is arranged within the housing, and the outer shield defines a standing wall surrounding the signal contact in a circumferential direction. The first potting reservoir is defined by a first face of the standing wall and a second face of the standing wall facing opposite the first face. The standing wall forms a boundary between the first potting reservoir and the second potting reservoir and defines a passage adapted to permit an uncured potting agent to pass between the first potting reservoir and the second potting reservoir.

20 Claims, 12 Drawing Sheets

(A)

(B)

COAXIAL CONNECTOR WITH WATERPROOF STRUCTURE

CROSS-REFERENCE TO RELATED APPLICATION

This application claims the benefit of Japanese Patent Application No. 2022-199134 filed on Dec. 14, 2022, the whole disclosure of which is incorporated herein by reference.

FIELD OF THE INVENTION

The present disclosure relates to a connector with a waterproof structure.

BACKGROUND

Connectors including waterproof structures are known. For example, a prior art connector includes a signal contact that extends in a rod form, and a cylindrical outer shield that is apart from the signal contact and surrounds the signal contact. A first sealing element is fitted between the signal contact and the outer shield, and a second sealing element is fitted in the outer periphery of the outer shield. The connector is mated with both of a first mating connector closer to a camera module and a second mating connector to which a cable is connected, to mediate transmission of signals closer to the camera module and the cable. The connector serves as preventing water entering the connector from leaking in the first mating connector closer to the camera module in the state of being mated with the first mating connector closer to the camera module and of being unmated with the second mating connector to which the cable is connected.

Recently, hardware downsizing and increases in the speed of signal transmissions have increasingly taken place. Therefore, contacts having small diameters have been used as signal contacts. In a case in which the diameter of such a signal contact is small, a hole with which the signal contact is perforated is narrower in order to waterproof the periphery of the signal contact, and it may be difficult to provide the hole with sufficient waterproofing.

A known method for improving waterproof performance includes making a potting reservoir, injecting a liquid potting agent into the potting reservoir, and curing the potting agent. The use of these methods in existing connector constructions, however, complicates assembly operations, and increases costs.

SUMMARY

According to an embodiment of the present disclosure, a connector comprises a housing, a signal contact, an outer shield, a first potting reservoir, and a second potting reservoir. The signal contact is arranged within the housing, and the outer shield defines a standing wall surrounding the signal contact in a circumferential direction. The first potting reservoir is defined by a first face of the standing wall, and a second face of the standing wall facing opposite the first face. The standing wall forms a boundary between the first potting reservoir and the second potting reservoir and includes a passage adapted to permit the passage of an uncured potting agent between the first potting reservoir and the second potting reservoir.

BRIEF DESCRIPTION OF THE DRAWINGS

The invention will now be described by way of example with reference to the accompanying Figures, of which.

DETAILED DESCRIPTION OF THE EMBODIMENTS

Figure 1:
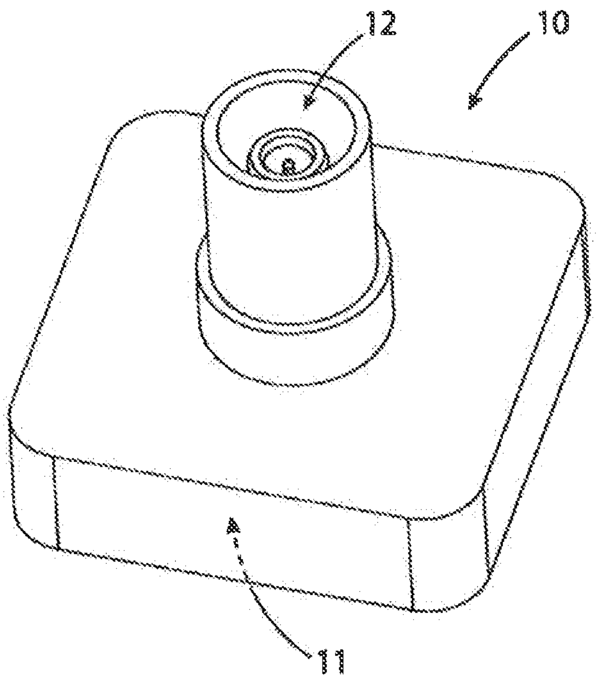
FIG. 1 is an isometric view of a connector as one embodiment of the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
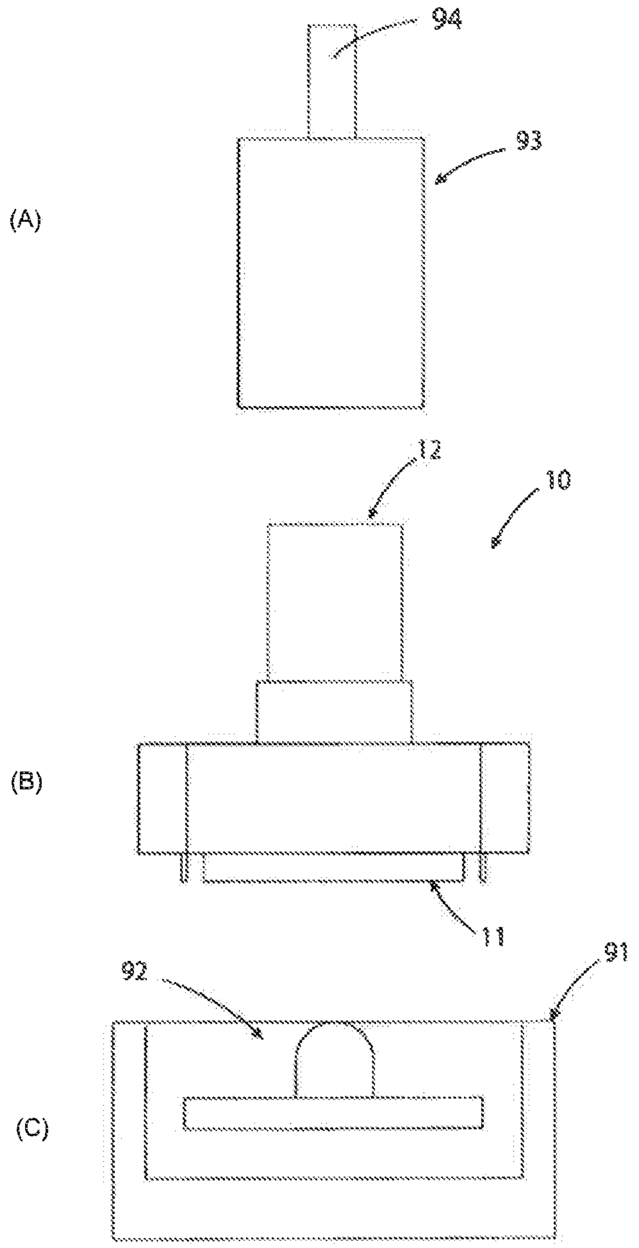
FIG. 2 is a view illustrating an example of a method of using the connector illustrated in FIG. 1.

FIG. 1 is an isometric view of a connector as one embodiment of the invention. FIG. 2 is a view illustrating an example of a method of using the connector illustrated in FIG. 1. The connector 10 as the embodiment of the invention illustrated in FIG. 1 is also illustrated in FIG. 2(B) of FIG. 2. The connector 10 includes a first mating portion 11 in a lower area and a second mating portion 12 in an upper area in a posture illustrated in FIG. 2. The connector 10 is mated with a first mating connector 92 received in a case 91, so as to cover the first mating connector with the first mating portion 11. The second mating portion 12 in the upper area is mated with a second mating connector 93. A cable 94 is connected to the second mating connector 93, with only a portion thereof illustrated.

The connector 10 illustrated in FIG. 2(B) is mated with both of the first mating connector 92 and the second mating connector 93, and carriers a signal that is transmitted between both the mating connectors. In an example described herein, the first mating connector 92 is a connector that is incorporated into a module including a camera that is mounted in a vehicle and plays a role in sending a signal from the camera. The connector 10 illustrated in FIG. 2(B) receives the signal of the camera from the first mating connector 92 and transmits the signal to the second mating connector 93. The cable 94 is connected to the second mating connector 93, and the signal transmitted to the second mating connector 93 is transmitted to an unillustrated, distantly positioned device such as a monitor through the cable 94.

The connector 10 may be in a state of being mated with the first mating connector 92 and being unmated with the second mating connector 93 in a process of manufacturing a vehicle or in a process of maintaining a vehicle. The module into which the first mating connector 92 is incorporated and on which the camera is mounted dislikes moisture. Therefore, it is necessary that the connector 10 is a connector in which waterproofing measures are taken to prevent water entering the connector 10 from leaking in an area closer to the first mating connector 92 even in the state of being unmated with the second mating connector 93. The waterproofing of the connector 10 is waterproofing in a stage prior to mating with the second mating connector 93 and is referred to as premating waterproofing or unmating waterproofing.

Figure 3:
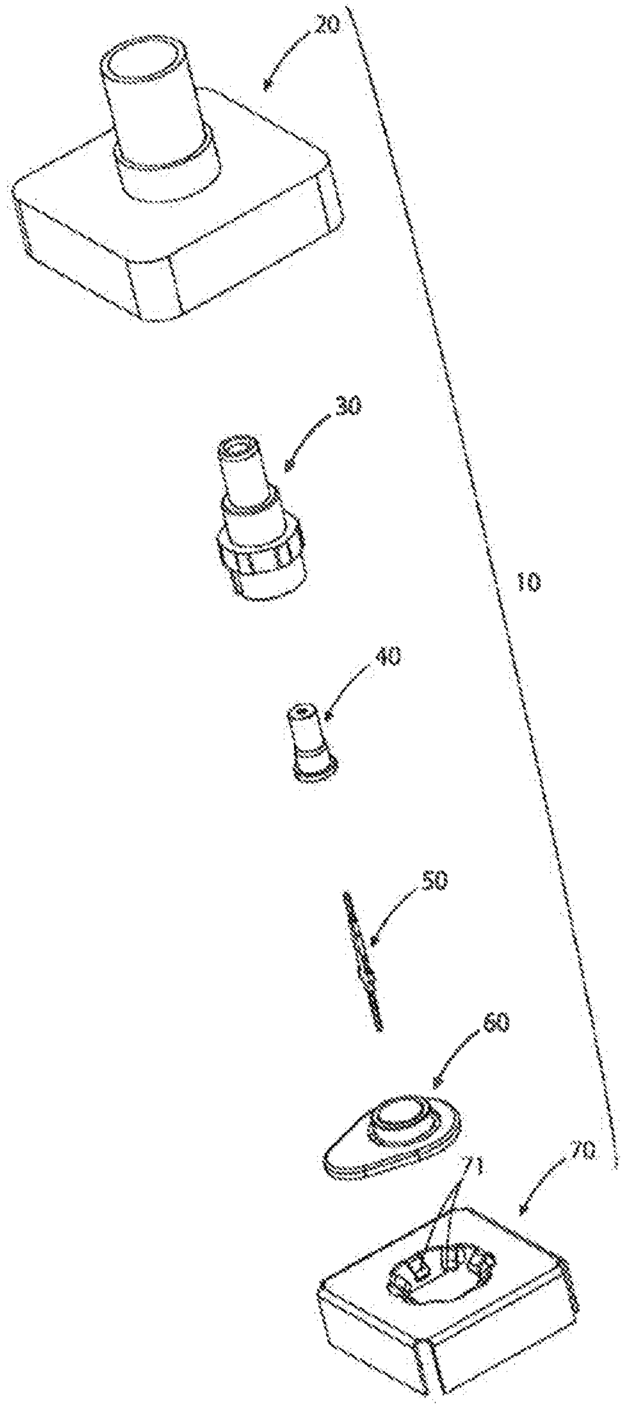
FIG. 3 is an exploded isometric view of the connector illustrated in FIG. 1.
Figure 4:
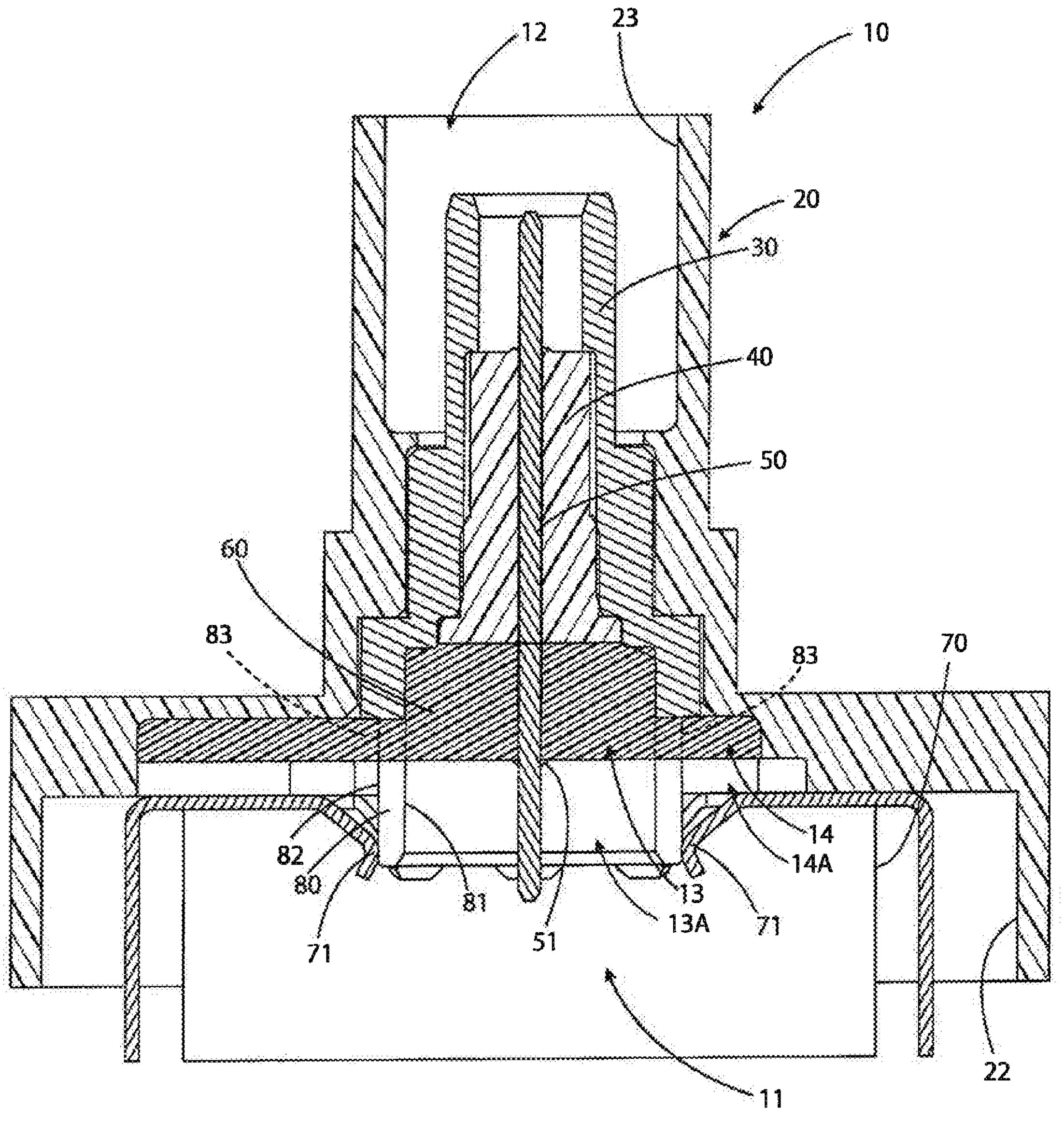
FIG. 4 is a longitudinal cross-sectional view of the connector illustrated in FIG. 1.

FIG. 3 is an exploded isometric view of the connector illustrated in FIG. 1. FIG. 4 is a longitudinal cross-sectional view of the connector illustrated in FIG. 1. The connector 10 includes an outer housing 20 made of resin, an outer shield 30 made of metal, an inner housing 40 made of resin, a signal contact 50 made of metal, a potting mass 60, and a case shell 70 made of metal, as illustrated in FIG. 3.

The signal contact 50 has a rod shape and plays a role in receiving the signal of the camera from the first mating contact 92 illustrated in FIG. 2 and in transmitting the signal to the second mating contact 93. The signal contact 50 is supported by the inner housing 40. The outer shield 30 is a cylindrical element, supports the inner housing 40 therein, and further supports the signal contact 50 in the center of the inner housing.

The potting mass 60 waterproofs the connector 10. The potting mass 60 is obtained by injecting a liquid potting agent into potting reservoirs 13, 14 illustrated in FIG. 5 in a process in the middle of assembly of the connector 10 and curing the potting agent. Typically, the potting mass 60 is unable to be separated from the potting reservoirs 13, 14. However, the cured potting mass 60 has been removed, and the shape thereof is illustrated in FIG. 3. The waterproof structure is completed by injecting the liquid potting agent into the potting reservoirs 13, 14, and curing the potting agent.

A standing wall 80 including a component of the connector 10 and including a first face 81 and a second face 82 is formed in the connector 10. The first potting reservoir 13 is formed to have a hollow shape in a region coming into contact with the first face 81 of the standing wall 80. The other second potting reservoir 14 is formed in a hollow shape in a region coming into contact with the second face 82 of the standing wall 80. The first potting reservoir 13 and the second potting reservoir 14 include openings 13A, 14A, respectively, that are opened in directions identical to each other (downward direction in FIG. 4). For injecting a potting agent, the connector 10 prior to the assembly of the case shell 70 is retained in a state in which the posture of the connector 10 illustrated in FIG. 4 is turned upside down, the potting agent is injected in the state in which the posture is turned upside down, and the state in which the posture is turned upside down is retained until the injected potting agent is cured and becomes the potting mass 60.

The standing wall 80 includes passages 83 through which an uncured potting agent is passed between the first potting reservoir 13 and the second potting reservoir 14. Therefore, the potting agent injected into one potting reservoir (for example, the potting reservoir 14) of the two potting reservoirs 13, 14 flows into the other potting reservoir (for example, the potting reservoir 13). Accordingly, curing of the injected potting agent causes formation of the potting mass 60 over the first potting reservoir 13 and the second potting reservoir 14.

The standing wall 80 in the present embodiment is formed as a portion of the outer shield 30 protruding between the first potting reservoir 13 and second potting reservoir 14. The signal contact 50 extending in a rod form protrudes toward the center of the first potting reservoir 13 formed in the region coming into contact with the first face 81 of the standing wall 80. The outer shield 30 forming the standing wall 80 spaced from the signal contact 50 and surrounds the signal contact 50.

The case shell 70 is attached after the curing of the injected potting agent. The segments 71 of the case shell 70 come into contact with portions of the standing wall 80 of the outer shield 30 to maintain ground potential. When the connector 10 is mated with the first mating connector 92, the first mating connector is covered with the connector, and the connector comes into contact with the ground of the first mating connector to shield the first mating connector.

The outer housing 20 includes a first mating opening 22 that is largely opened downward, and further includes a second mating opening 23 that is opened upward. The case shell 70 is positioned in the first mating opening 22. When the connector 10 is mated with the first mating connector 92, the first mating connector is covered with the case shell 70, and the outer housing 20 is fixed into the case 91. The second mating connector 93 is fixed into the second mating opening 23 when the second mating opening is mated with the second mating connector.

Figure 5:
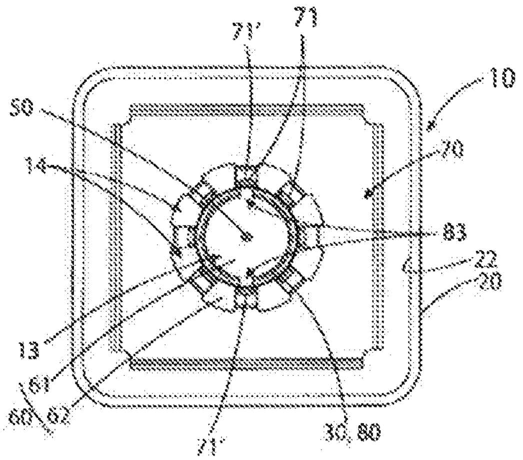
FIG. 5 is a bottom view of the connector illustrated in FIG. 1, viewed from below.
Figure 5:
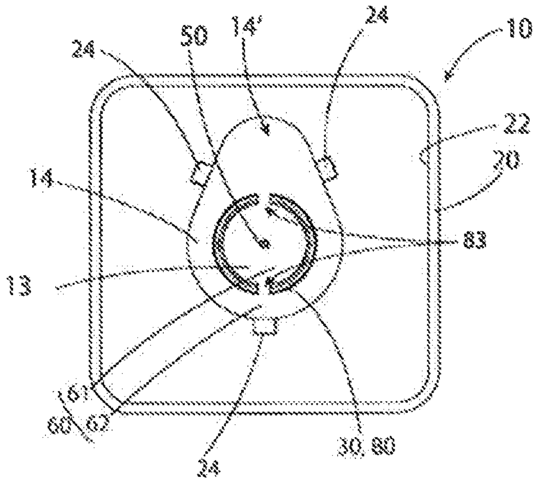
Figure 6:
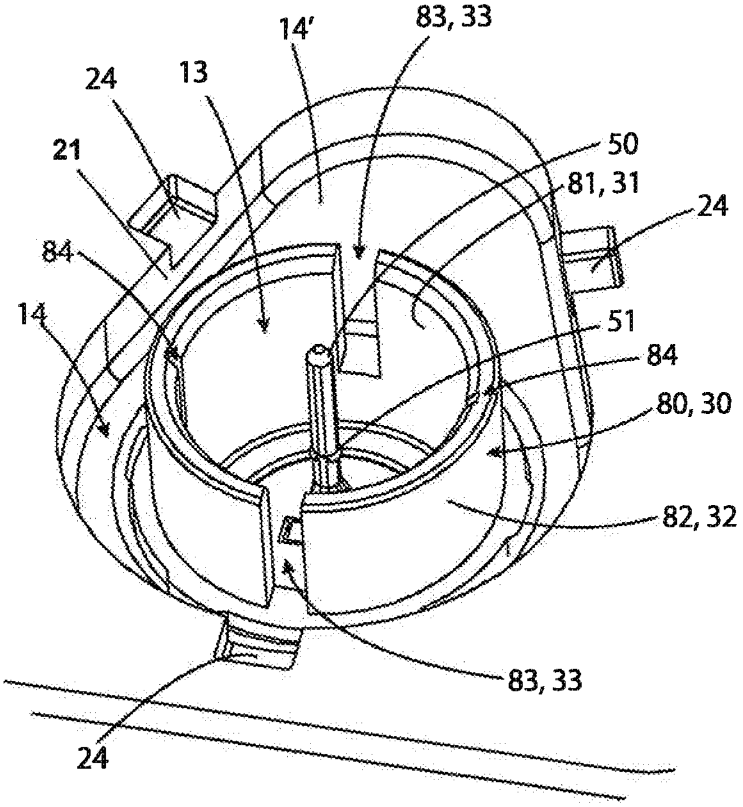
FIG. 6 is an isometric view of an area including first and second potting reservoirs into which a potting agent has not yet been injected.
Figure 7:
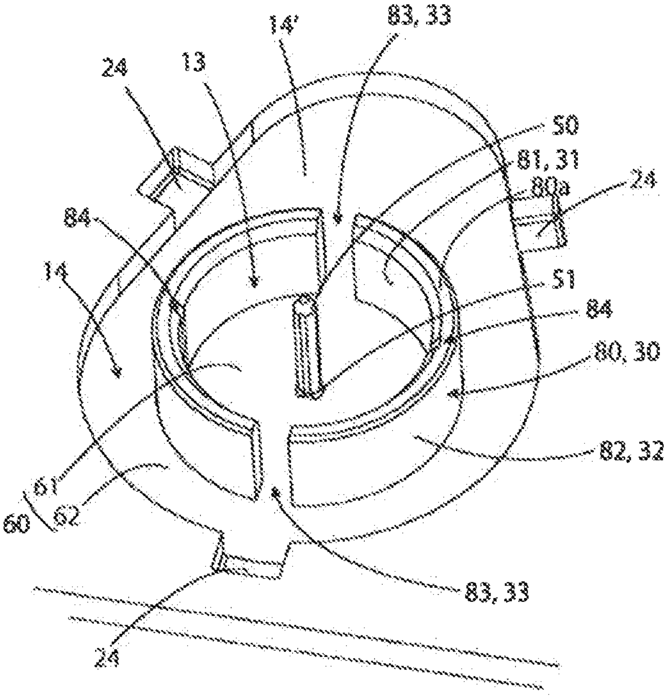
FIG. 7 is an isometric view of an area including the first and second potting reservoirs into which the potting agent has been injected.

FIG. 5 is a bottom view of the connector illustrated in FIG. 1, viewed from below. FIG. 5(A) is a bottom view in a state in which the case shell is attached, and FIG. 5(B) is a bottom view in a state in which the case shell is removed. FIG. 6 is an isometric view of an area including the first and second potting reservoirs into which the potting agent has not yet been injected. FIG. 7 is an isometric view of an area including the first and second potting reservoirs into which the potting agent has been injected.

As described above, the potting agent is injected into the first and second potting reservoirs 13 and 14 so that the posture of the connector 10 that is being assembled is turned upside down. FIG. 5(A) illustrates that the case shell 70 spreads in the interior of the first mating opening 22 of the outer housing 20. The segments 71 of the case shell 70 come into contact with the outer shield 30, and the case shell 70 has a maintained ground potential.

The signal contact 50 is illustrated in the center of the outer shield 30. The first potting reservoir 13 is formed in a region that is around the signal contact 50 and is surrounded by the outer shield 30. The second potting reservoir 14 is formed outside the outer shield 30. FIG. 5(A) illustrates that only portions of the second potting reservoir 14 appear from between the segments 71 of the case shell 70.

The standing wall 80 including the portion of the outer shield 30 is disposed upright on the boundary between the first potting reservoir 13 and the second potting reservoir 14, and the passages 83 through which an uncured potting agent is passed are formed in the standing wall. In this embodiment, the passages 83 are slits 33 opened to an edge closer to the first opening 13A and the second opening 14A, of the standing wall 80. The height of a potting mass 61 in the first potting reservoir 13 and the height of a potting mass 62 in the second potting reservoir 14, in the potting mass 60, are equal to each other.

In the second potting reservoir 14, a portion 14', in a radially outward direction, around the outer wall 32 of the outer shield 30, which is the second face 82 of the standing wall 80, is wider than a portion excluding the portion 14'. This is because the alignment accuracy of a nozzle (not illustrated), through which a potting agent is injected, with respect to the second potting reservoir 14 is relaxed. The formation of the wider portion 14' results in the enhanced efficiency of an operation of injecting a potting agent.

On the signal contact 50, a collar portion 51 that protrudes in a lateral direction with respect to in an upward-downward direction in which the signal contact 50 extends is formed in a portion protruding in the center of the first potting reservoir 13. The collar portion 51 plays a role as an indicator for indicating an appropriate injection amount in the case of injecting a potting agent into the first potting reservoir 13. In other words, the potting agent is injected up to a height reaching the collar portion 51 in the case of injecting the potting agent. The collar portion 51 also plays a role in preventing the potting agent from further moving upward on the wall surface of the signal contact 50 due to surface tension when the potting agent is injected into the first potting reservoir 13. Thus, the reliability of the signal transmission performance of the signal contact 50 is maintained.

Grooves 84 extending to depth positions at some midpoints are formed on the inner wall surface 31 of the standing wall 80. The grooves 84 also play a role as indicators for indicating an appropriate injection amount in the case of injecting a potting agent. In other words, the injection of the potting agent up to the heights of the lower ends of the grooves 84 means the injection of an appropriate amount of the potting agent.

In addition, recesses 24 dented up to depth positions at some midpoints of the second potting reservoir 14 are formed on an inner wall surface 21 of the outer housing 20, forming a wall surface, farther from the standing wall 80, of the second potting reservoir 14. The recesses 24 also play a role as indicators for indicating an appropriate injection amount in the case of injecting a potting agent. The recesses 24 are disposed at three places in a round direction. Therefore, the recesses 24 are also indicators for indicating whether or not the connector 10 leans in the case of injecting a potting agent.

Figure 8:
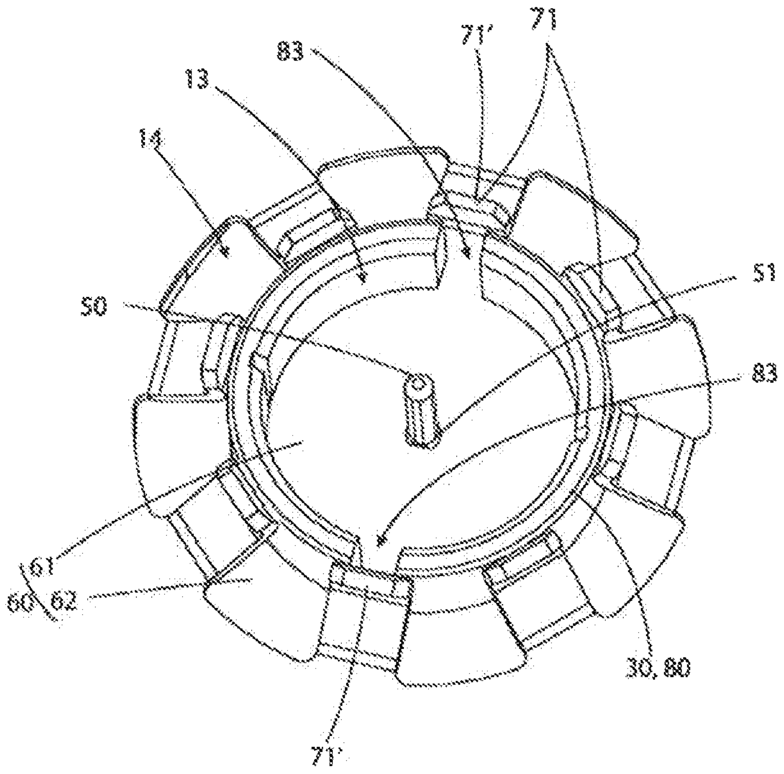
FIG. 8 is an isometric view illustrating an area including the potting reservoirs after formation of a potting mass and after attachment of a case shell.

FIG. 8 is an isometric view illustrating an area including the potting reservoirs after the formation of the potting mass and after the attachment of the case shell. The segments 71, coming into contact with the outer shield 30 (standing wall 80) of the case shell 70 are illustrated. The segments 71 come into contact with the outer shield 30 (standing wall 80) to transmit the ground potential thereof to the first mating connector 92 (see FIG. 2). Two segments 71' among the segments 71 are disposed at positions facing the passages 83 (slits 33) disposed in the standing wall 80. The signal transmission performance of the connector 10 may be adversely affected by the presence of the passages 83 such as the slits 33 in the outer shield 30. In the present embodiment, disposition of the segments 71' at the positions facing the passages 83 (slits 33) in the outer shield 30, to cover portions of the passages, results in improvement in signal transmission performance in comparison with a case in which the portions are not covered.

As described above, in accordance with the connector of the present embodiment, the passages 83 through which an uncured potting is passed are disposed in the standing wall 80 that causes partitioning into the first potting reservoir 13 and the second potting reservoir 14. Therefore, the potting agent can be injected into both of the first potting reservoir 13 and the second potting reservoir 14 at a time, to simplify the step of injecting a potting agent.

Figure 9:
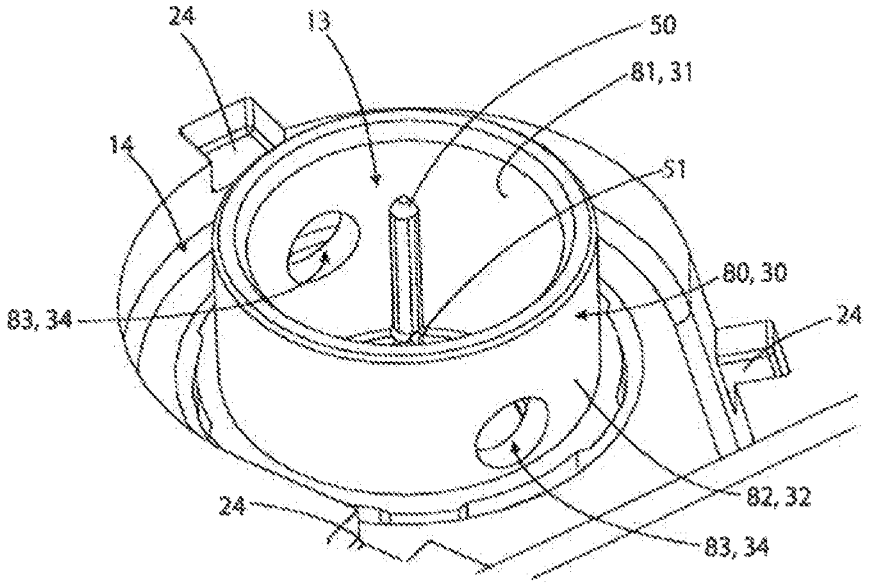
FIG. 9 is an isometric view of an area including first and second potting reservoirs into which a potting agent has not yet been injected in First Alternative Example.
Figure 10:
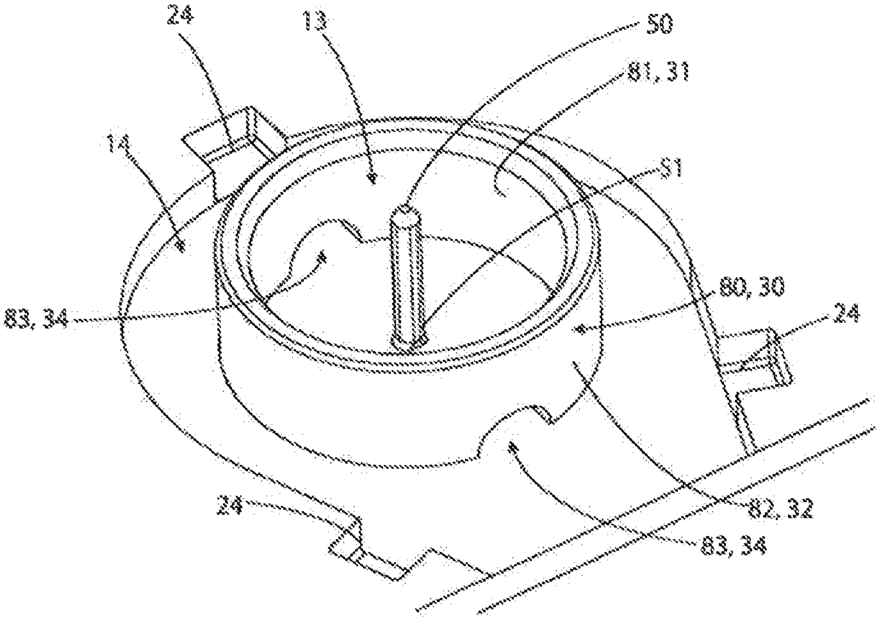
FIG. 10 is an isometric view of an area including the first and the second potting reservoirs into which the potting agent has been injected in First Alternative Example.

FIG. 9 is an isometric view of an area including first and second potting reservoirs into which a potting agent has not yet been injected in a First Alternative Example. FIG. 10 is an isometric view of an area including the first and the second potting reservoirs into which the potting agent has been injected in the First Alternative Example. FIGS. 9 and 10 are views corresponding to FIGS. 6 and 7, respectively, in the first embodiment described above.

In FIGS. 6 and 7, the passages 83 formed in the standing wall 80 are the slits 33. In the First Alternative Example illustrated in FIGS. 9 and 10, however, passages 83 are holes 34 drilled through the first face 81 and second face 82 of a standing wall 80. In FIGS. 6 and 7, the grooves 84 as indicators for indicating an appropriate injection amount in the case of injecting a potting agent are formed in the first face 81 of the standing wall 80. However, grooves defining the grooves 84 are not formed in the First Alternative Example illustrated in FIGS. 9 and 10. A collar portion 51 disposed in a signal contact 50, and recesses 24 formed on a wall surface, farther from the standing wall 80, of a second potting reservoir 14 serve as indicators for indicating the appropriate injection amount of a potting agent. As described above, the passages 83 through which an uncured potting agent is passed may be the slits 33 or the holes 34. Any shape of such a slit or hole as each passage 83 is acceptable.

Figure 11:
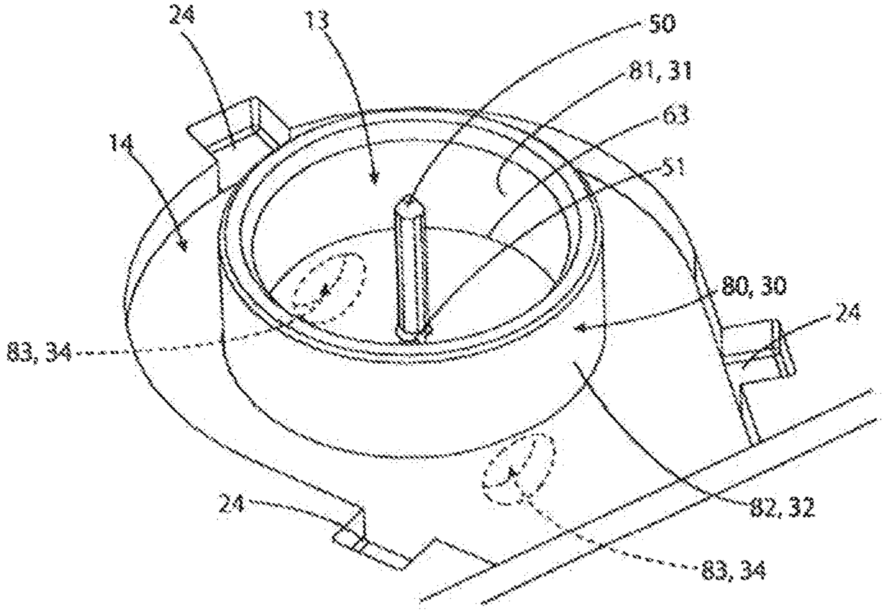
FIG. 11 is an isometric view of an area including first and second potting reservoirs into which a potting agent has been injected at the first stage in Second Alternative Example.
Figure 12:
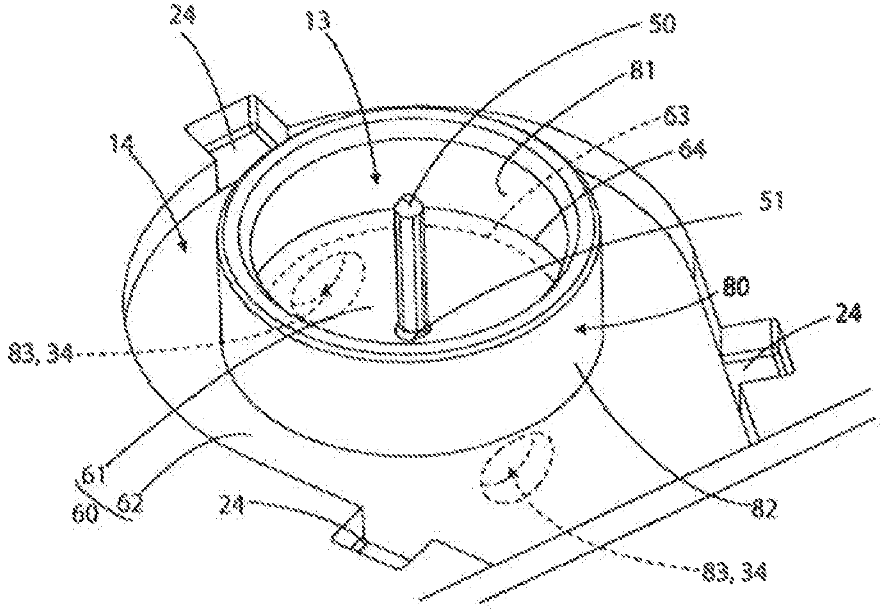
FIG. 12 is an isometric view of an area including the first and second potting reservoirs into which a potting agent has been injected at the second stage in Second Alternative Example.

FIG. 11 is an isometric view of an area including first and second potting reservoirs into which a potting agent has been injected at the first stage in a Second Alternative Example. FIG. 12 is an isometric view of an area including the first and second potting reservoirs into which a potting agent has been injected at the second stage in the Second Alternative Example. In the Second Alternative Example, holes 34 as passages 83 are also formed. However, the holes 34 in the Second Alternative Example are formed at positions closer to the bottoms of potting reservoirs 13, 14 than the holes 34 in the First Alternative Example.

First, a potting agent is injected up to a height that corresponds to an appropriate injection amount for the second potting reservoir 14 as injection at the first stage and is flush with the bottom of each recess 24. However, the potting agent does not reach the collar portion 51 of a signal contact 50 in a state in which the potting agent is injected up to the height. The injection of the potting agent up to the height causes the holes 34 as the passages 83 to be in a state in which the holes 34 are under the injected potting agent. In this state, the injected potting agent is cured to such a degree that the potting agent is prevented from flowing through the holes 34.

Then, a potting agent at the second stage is injected into the first potting reservoir 13 until the injected potting agent reaches the height of the collar portion 51. The potting agent including the potting agent at the second stage is sufficiently cured to form the potting mass 60. In such a manner, the potting mass 60 in which the height of a potting mass 61 in the first potting reservoir 13 is greater than the height of a potting mass 62 in the second potting reservoir 14 is formed. In contrast to the Second Alternative Example described herein, the potting mass 60 in which the height of a potting mass 62 in a second potting reservoir 14 is greater than the height of a potting mass 62 in a first potting reservoir 13 can also be formed by adjusting the height positions of recesses 24 and the height position of a collar portion 51.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:

a housing;

an outer shield defining a standing wall and received within the housing;

a first potting reservoir formed in a hollow shape in a region coming into contact with a first face of the standing wall and including a first opening, the first potting reservoir is defined by the first face of the standing wall; and a second potting reservoir formed in a hollow shape in a region coming into contact with a second face of the standing wall and including a second opening that is opened in a direction identical to a direction of the first opening of the first potting reservoir, the second potting reservoir is defined by the second face of the standing wall and a portion of the housing, the second face of the standing wall is opposite the first face of the standing wall, the standing wall having a passage adapted to permit an uncured potting agent to pass between the first potting reservoir and the second potting reservoir, and a potting mass formed by the curing of the potting agent and formed integrally over the first potting reservoir and the second potting reservoir.

2. The electrical connector according to claim 1, wherein the passage is a slit opened at an end of the standing wall proximate the first opening and the second opening.

3. The electrical connector according to claim 2, wherein a height of the potting mass in the first potting reservoir and a height of the potting mass in the second potting reservoir are equal to each other.

4. The electrical connector according to claim 2, wherein a height of the potting mass in the first potting reservoir and a height of the potting mass in the second potting reservoir are different from each other.

5. The electrical connector according to claim 1, wherein the passage is a hole formed through the standing wall.

6. The electrical connector according to claim 1, further comprising an elongated signal contact protruding through the first potting reservoir.

7. The electrical connector according to claim 6, wherein the outer shield surrounds the signal contact, the outer shield forming a boundary between the first potting reservoir and the second potting reservoir.

8. The electrical connector according to claim 7, further comprising a case shell in conductive contact with the outer shield, the case shell is adapted to transmit an electrical potential of the outer shield to a mating connector when the mating connector is mated with the electrical connector.

9. The electrical connector according to claim 8, wherein the case shell includes a segment facing the passage.

10. The electrical connector according to claim 8, wherein a portion of the second potting reservoir around the outer shield is wider in a radial direction than a remaining portion of the second potting reservoir.

11. The electrical connector according to claim 1, further comprising:

a first mating portion adjacent a top of the outer shield and adapted to be mated with a first mating connector; and a second mating portion adjacent a bottom of the outer shield and adapted to be mated with a second mating connector, the top of the outer shield is opposite the bottom of the outer shield, the electrical connector passes a signal transmitted between the first mating connector and the second mating connector when the electrical connector is mated with the first mating connector via the first mating portion and the second mating connector via the second mating portion.

12. The electrical connector according to claim 11, wherein the potting mass prevents water entering the electrical connector from leaking into an area proximate to the first mating connector in a state wherein the first mating portion is mated to the first mating connector and the second mating portion is unmated from the second mating connector.

13. An electrical connector, comprising:

a housing;

a signal contact arranged within the housing;

an outer shield defining a standing wall and received within the housing, the standing wall surrounding the signal contact in a circumferential direction;

a first potting reservoir formed in a hollow shape, the first potting reservoir defined by a first face of the standing wall and having a first opening opened in a first direction, the signal contact protruding through the first potting reservoir; and a second potting reservoir defined at least partially by a second face of the standing wall and a portion of the housing, the second face of the standing wall is opposite the first face of the standing wall, the second potting reservoir including a second opening opened in the first direction, the standing wall forming a boundary between the first potting reservoir and the second potting reservoir and having a passage adapted to permit an uncured potting agent to pass between the first potting reservoir and the second potting reservoir.

14. The electrical connector according to claim 13, wherein the passage is a slit opened at an end of the standing wall proximate the first opening and the second opening.

15. The electrical connector according to claim 13, wherein the passage is a hole formed through the standing wall.

16. The electrical connector according to claim 13, wherein the second potting reservoir is defined between the second face of the standing wall and an interior wall of the housing.

17. The electrical connector according to claim 13, further comprising a case shell in conductive contact with the outer shield, the case shell is adapted to transmit an electrical potential of the outer shield to a mating connector when the mating connector is mated with the electrical connector.

18. The electrical connector according to claim 13, wherein a portion of the second potting reservoir arranged about the outer shield is wider in a radial direction than a remaining portion of the second potting reservoir.

19. The electrical connector according to claim 13, further comprising a potting mass formed in the first potting reservoir, the passage, and the second potting reservoir.

20. The electrical connector according to claim 19, wherein a height of the potting mass in the first potting reservoir and a height of the potting mass in the second potting reservoir are distinct from each other.

* * * * *